A. F. JACQUEMIN.
COUNTER MOLDING MACHINE.
APPLICATION FILED MAY 7, 1918.

1,332,259.

Patented Mar. 2, 1920.
8 SHEETS—SHEET 1.

INVENTOR
Auguste F. Jacquemin
By his Attorney,
J. H. McCready.

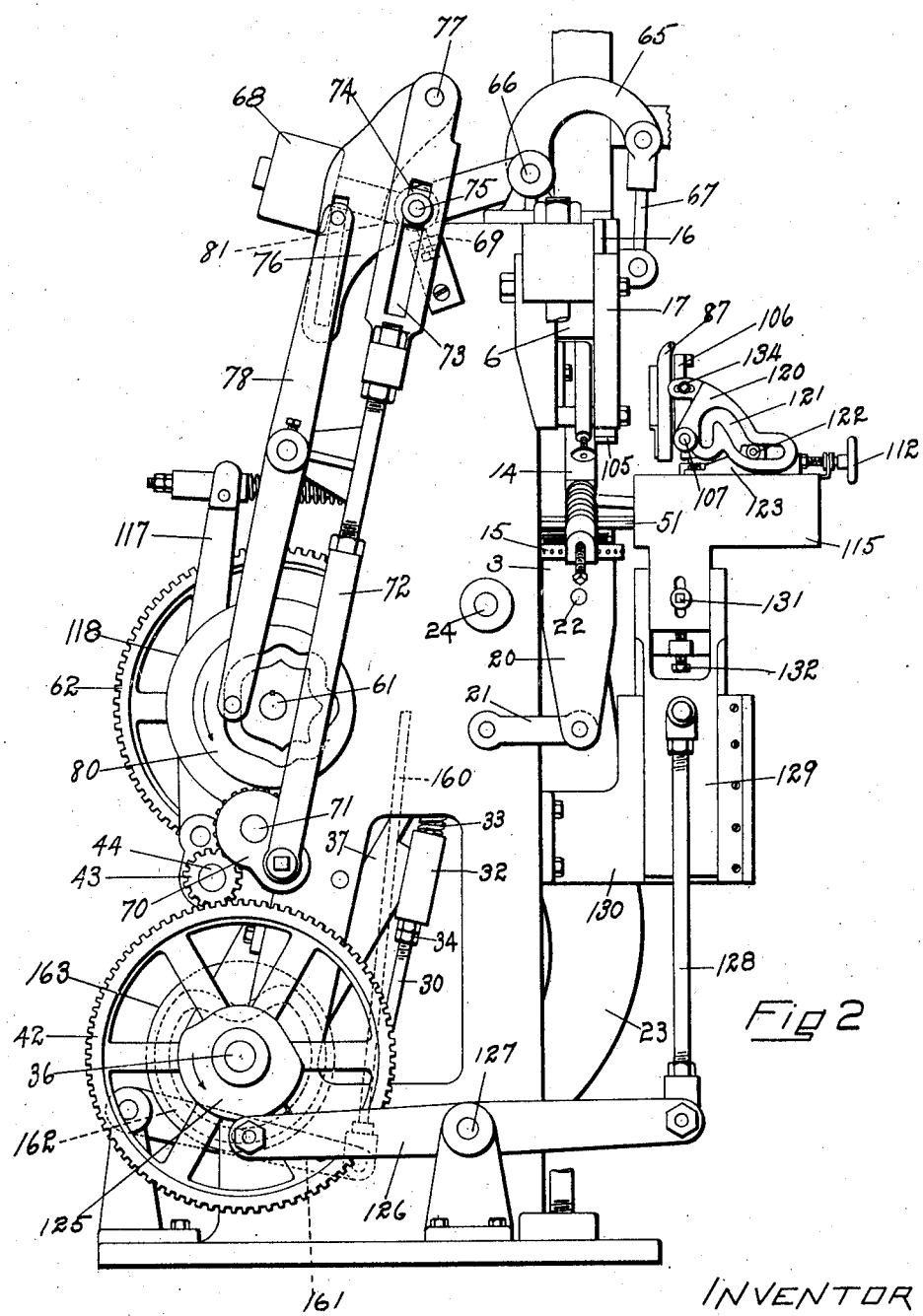

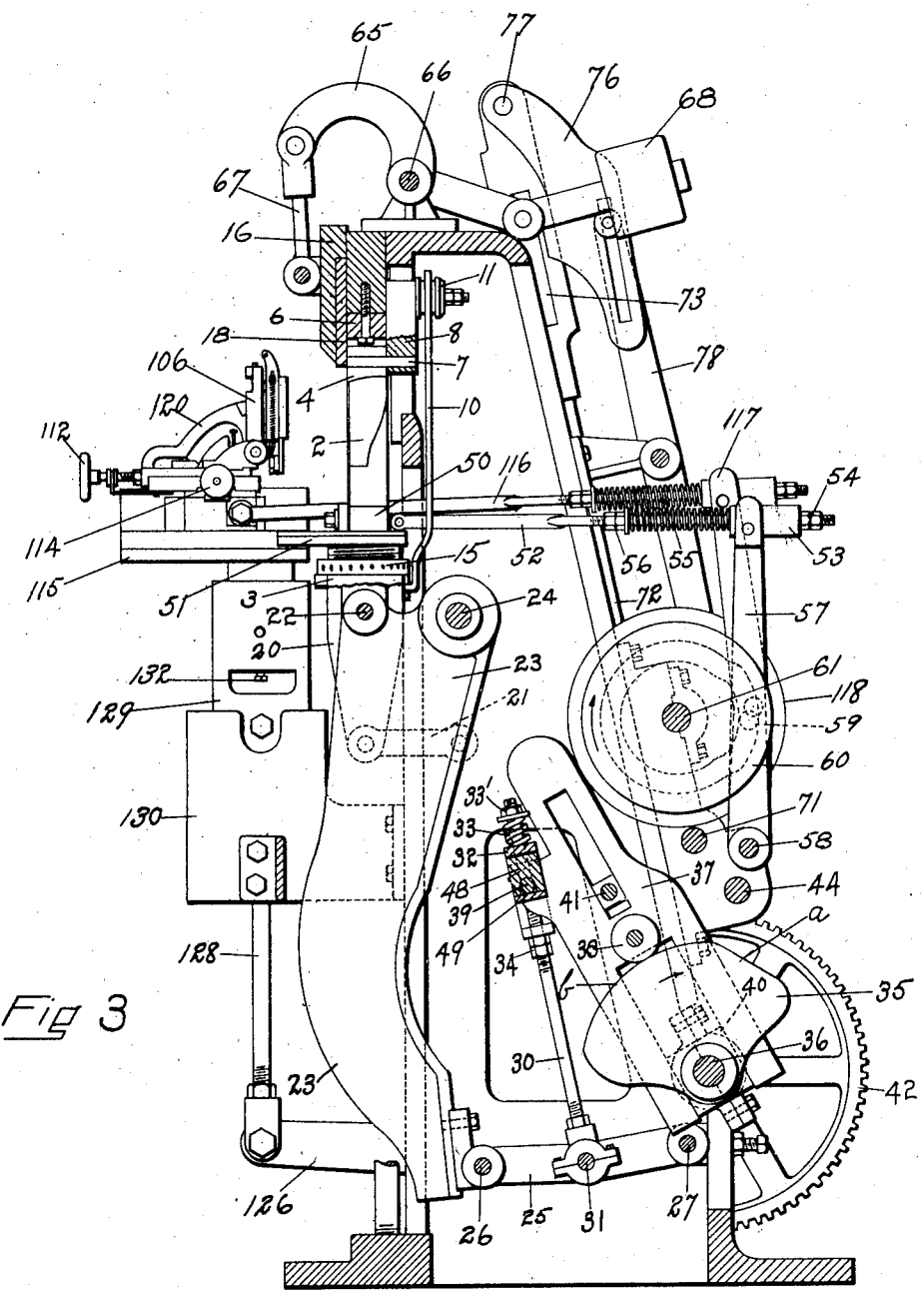

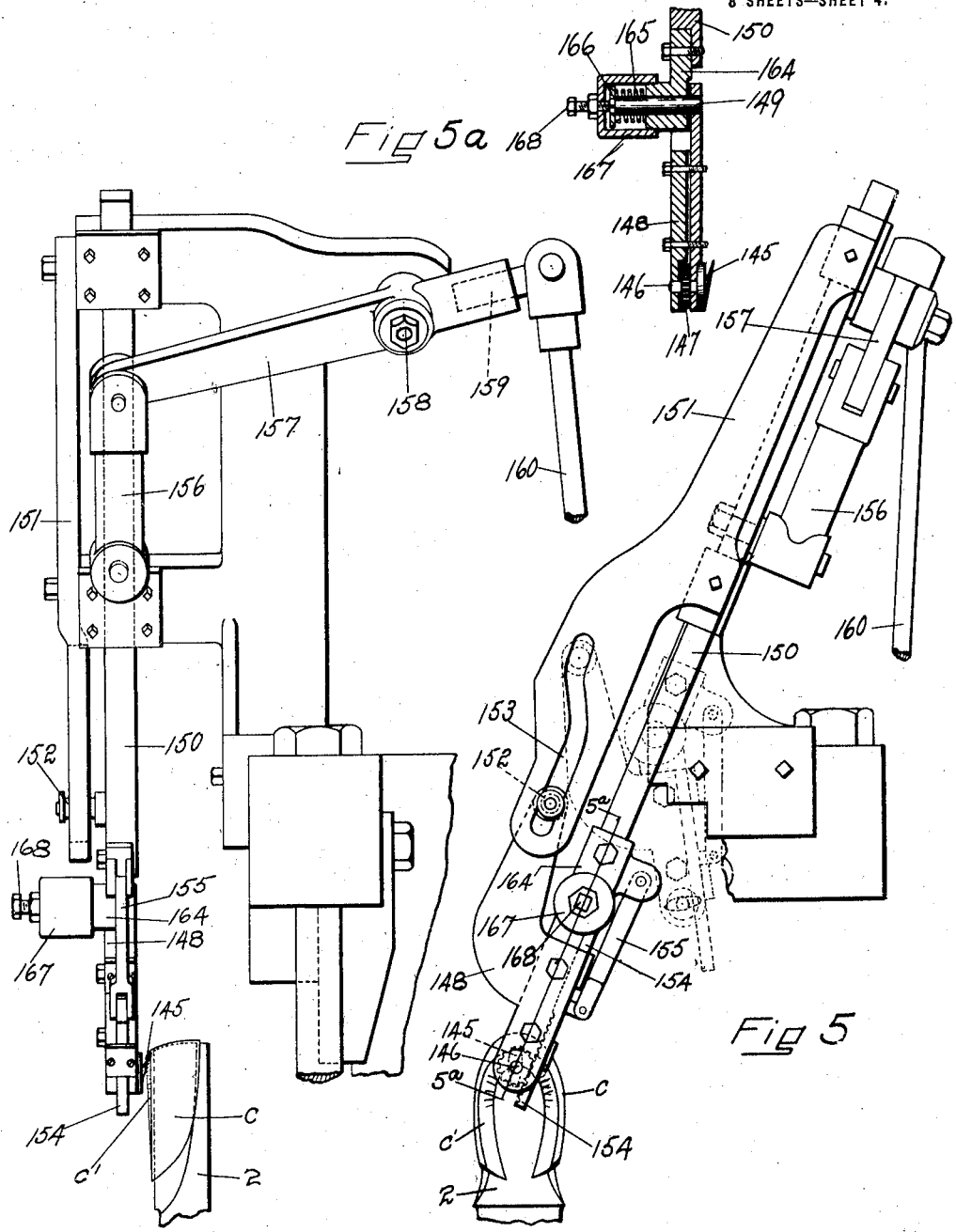

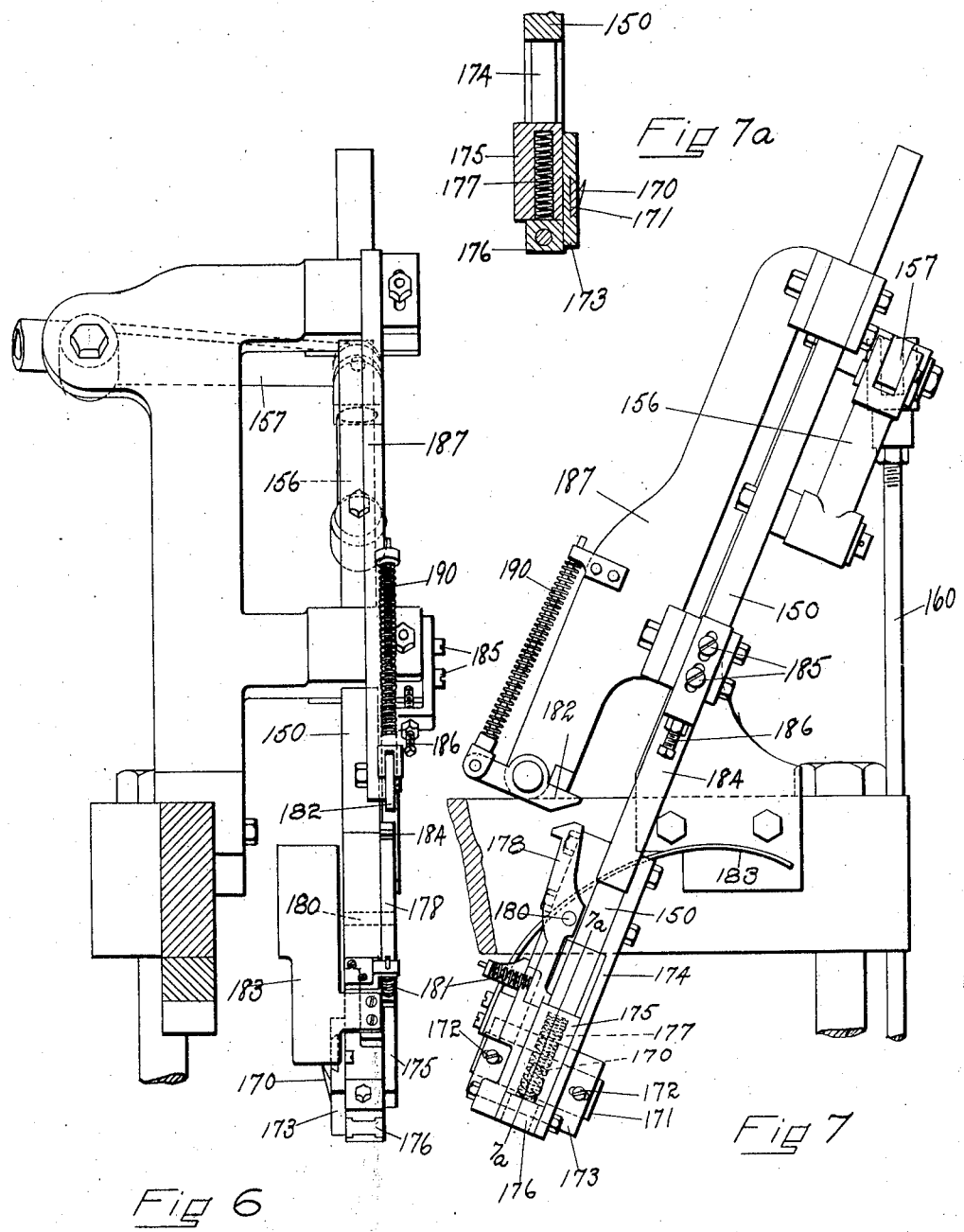

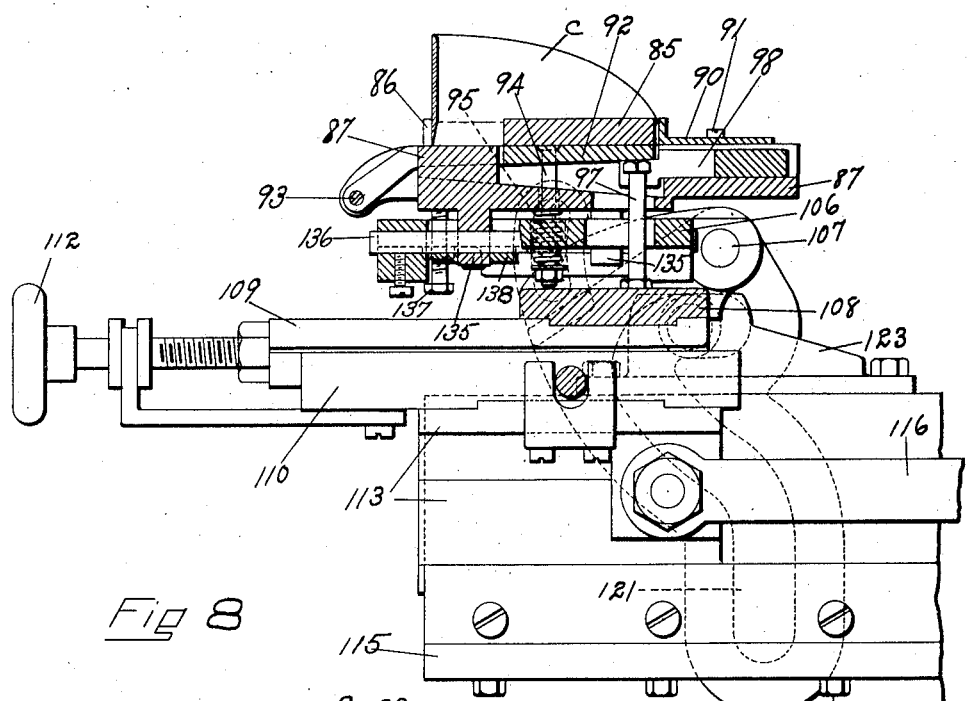
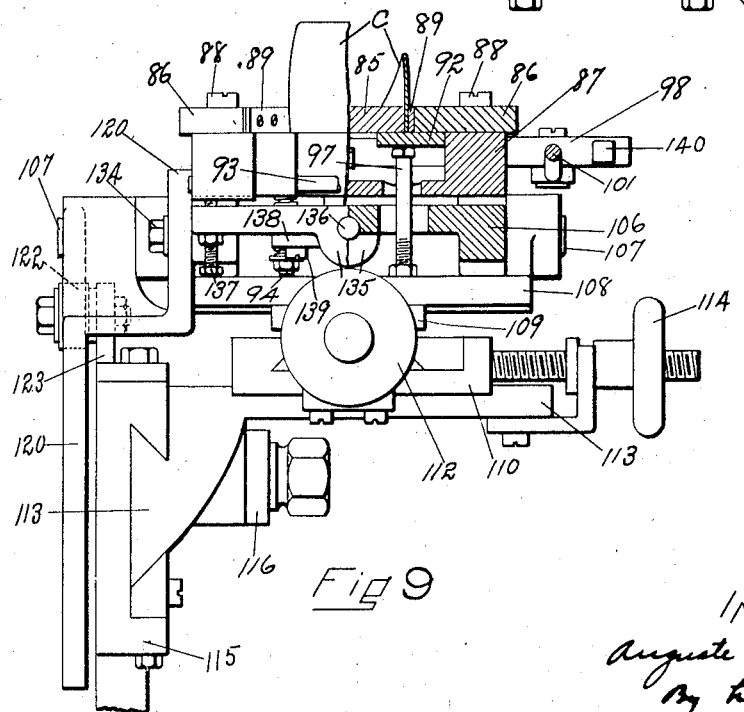

A. F. JACQUEMIN.
COUNTER MOLDING MACHINE.
APPLICATION FILED MAY 7, 1918.

1,332,259.

Patented Mar. 2, 1920.
8 SHEETS—SHEET 7.

INVENTOR
Auguste F. Jacquemin
By his Attorney
J. H. McCrady.

UNITED STATES PATENT OFFICE.

AUGUSTE F. JACQUEMIN, OF KENNEBUNK, MAINE, ASSIGNOR TO ROGERS FIBRE COMPANY, OF KENNEBUNK, MAINE, A CORPORATION OF MAINE.

COUNTER-MOLDING MACHINE.

1,332,259.   Specification of Letters Patent.   Patented Mar. 2, 1920.

Application filed May 7, 1918. Serial No. 233,031.

*To all whom it may concern:*

Be it known that I, AUGUSTE F. JACQUEMIN, a citizen of the United States, residing at Kennebunk, in the county of York and State of Maine, have invented certain Improvements in Counter-Molding Machines, of which the following description, in connection with the accompanying drawings, is a specification, like reference characters on the drawings indicating like parts in the several figures.

This invention relates to counter molding and similar machines which are utilized to shape a blank into suitable form for incorporation in a shoe. The requirements of shoe making have become more exacting in modern times and most shoe manufacturers now demand a counter that is molded very accurately to fit the heel portion of the last on which the shoe is to be made and one that will retain its shape under relatively severe conditions. These requirements have placed additional demands on the machines used to mold these articles and have necessitated the adoption of expedients heretofore regarded as unnecessary. For instance, it is now considered necessary by some counter manufacturers to heat the molds of a counter molding machine for the purpose of producing a more accurately molded counter and one that will retain its shape for a longer time.

It is one of the chief objects of the present invention to devise a counter molding machine that will meet these additional requirements and which will produce counters thoroughly satisfactory to the trade at a decreased machine expense. To this end the invention is directed to the improvement of the mechanisms that are employed to apply pressure to the molds to give them their counter molding action and of the mechanism that forms the flange on the counter with a view particularly to avoiding the use of heated molds while still producing counters fully as satisfactory as those produced with the aid of heat.

The invention also aims to devise a more efficient counter feeding mechanism than those heretofore used, to provide improved means for removing or "doffing" the counter from the molds, and generally to improve the construction and organization of machines of this character.

The manner in which it is proposed to accomplish these objects will be readily understood from the following description of the embodiment of the invention at present preferred and the novel features will be particularly pointed out in the appended claims.

Referring now to the drawings,

Fig. 2 is a left side elevation of the machine shown in Fig. 1;

Fig. 3 is a right side elevation partly in central cross section of the machine shown in Fig. 1;

Fig. 4 is a right side elevation of a doffer mechanism;

Fig. 5 is a front elevation of the doffer mechanism shown in Fig. 4;

Figure 10:
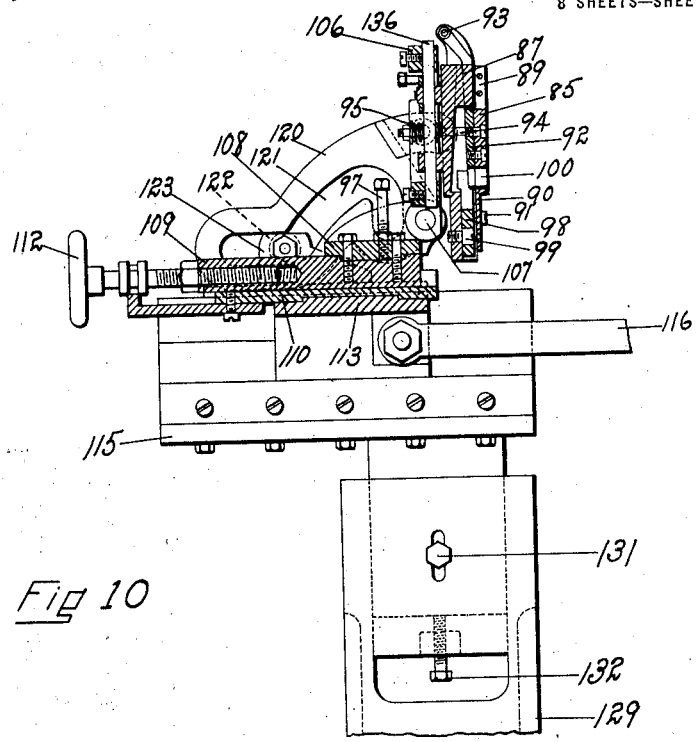
Figure 11:
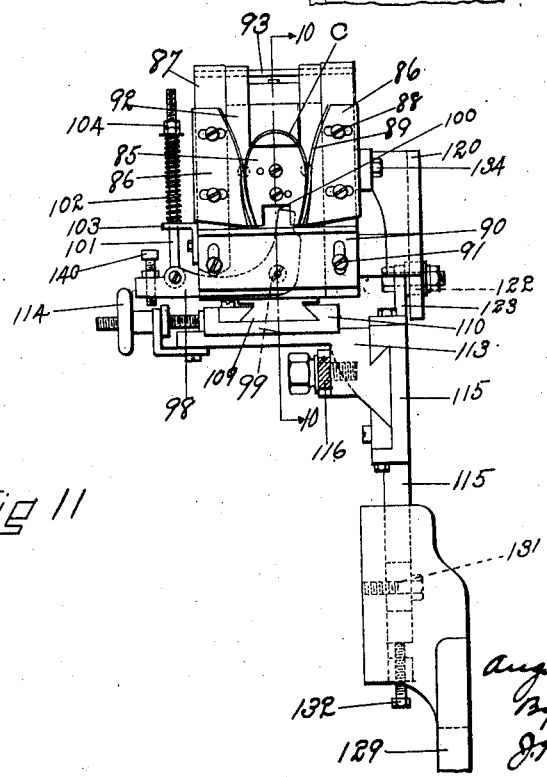
Figure 12:
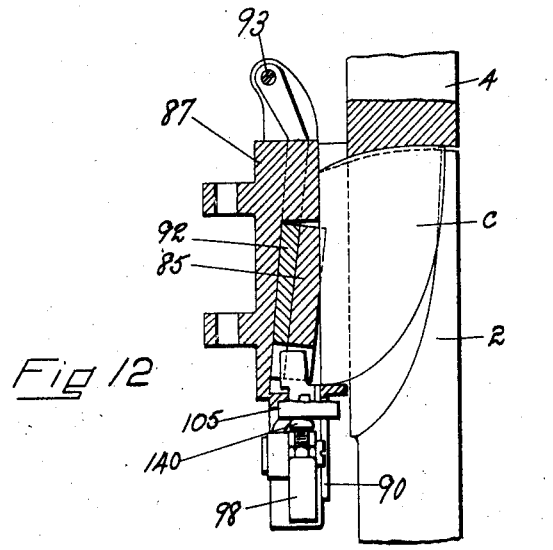
Figure 13:
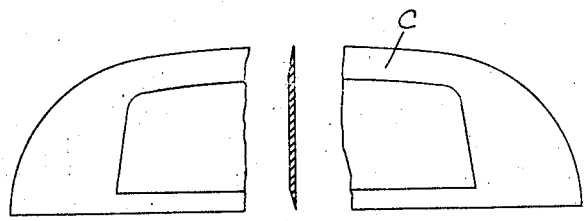

Fig. 5$^a$ is a cross sectional view on the line 5$^a$—5$^a$, Fig. 5;

Fig. 6 is a left side elevation of a doffer mechanism of a different construction;

Fig. 7 is a front elevation of the mechanism shown in Fig. 6;

Fig. 7$^a$ is a cross sectional view on the line 7$^a$—7$^a$, Fig. 7;

Fig. 8 is a view partly in side elevation and partly in vertical cross section of the counter feeder mechanism;

Fig. 9 is a rear elevation partly in cross section of the mechanism shown in Fig. 8;

Fig. 10 is a cross sectional view of the feeder mechanism on the line 10—10, Fig. 11;

Fig. 11 is a front elevation of the mechanism shown in Fig. 10;

Fig. 12 is a cross sectional view showing the feeder delivering a counter to the molds;

Fig. 13 shows a counter blank, and

Figure 14:
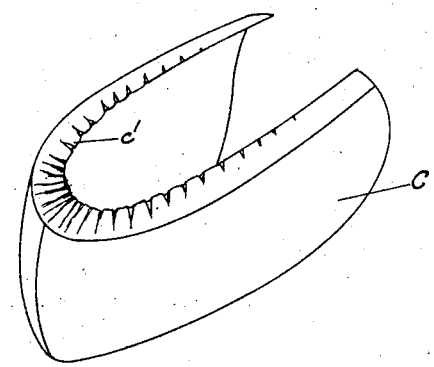

Fig. 14 is an angular view of a molded counter.

For the purpose of facilitating the understanding of the detailed description of the machine shown in the accompanying drawings, the machine may be briefly described as follows:

It comprises counter shaping molds consisting of a center mold and two side molds with means for relatively moving the molds from an open position, in which the side molds are separated from the center molds to permit the insertion of a counter blank between them or the removal of a molded counter from the center mold, to a closed position in which they exert a very heavy pressure upon the counter blank. While the counter is held in the grip of the molds the projecting flange of the counter is bent over and crimped against the front face of the center mold by a wiper plate that reciprocates over the front faces of the three molds. A feeding mechanism acts automatically to present the counter blanks to the molds for the molding operation and a doffer mechanism also acts automatically to remove the molded counter from the center mold. The operative or attendant therefore is required merely to place the counter blanks in the feeder and the machine then performs the remaining operations automatically. Fig. 13 shows a counter blank in the form in which it is brought to the machine, and Fig. 14 shows a completely molded counter in the form in which it is removed from the machine.

Referring now to the drawings, the center mold, indicated at 2, has substantially the shape of the heel portion of the last which the molded counters are intended to fit, and this mold is mounted on a mold carrier 3 upon which it is raised and lowered at certain times in each cycle of operations of the machine. The side molds, indicated at 4, are mounted on short struts 5 having cylindrical end portions that are positioned respectively in suitable sockets in the molds and in similar sockets in a mold carrier 6 supported in the machine frame. These side molds have a recess to receive a pin 7 which, when raised and lowered, opens and closes the side molds. This pin is carried by a block 8, Fig. 3, mounted in a suitable guideway formed in the machine frame and it is raised and lowered by a rod 10, to the upper end of which it is connected by a friction mechanism 11, the lower end of this rod being secured to the center mold carrier 3. The mold carrier 3 is provided with a pair of spring-pressed thrust blocks 14, Fig. 1, carrying rocker members at their upper ends to engage the outer faces of the two side molds when the carrier rises and thus press the lower ends of the side molds firmly against the sides of the center mold. Adjusting devices 15, Fig. 3, are interposed between the center mold and the carrier 3 to enable the operative to adjust the center mold vertically with reference to the side molds.

The wiper 16 slides in suitable ways 17 in the machine frame and carries a wiper plate 18 which is removably secured to the wiper by screws. This wiper is reciprocated vertically, carrying the wiper plate up and down over the front faces of the molds 2 and 4.

The mechanism so far described is substantially like that of the Stewart counter molding machine which is well known to the trade and has been on the market for a great many years. Consequently a more detailed description of the parts so far referred to is unnecessary.

As above indicated, one of the objects of this invention is to improve the mechanism by which the counter molding pressure is applied to the molds. In the machine shown the center mold carrier 3 is provided at opposite sides with depending arms 20 and the lower ends of these arms are pivoted to links 21, Fig. 3, the other ends of which are pivoted to the machine frame. The carrier 3 is also pivoted at 22 to the forwardly projecting arm of a large bell crank lever 23 that is fulcrumed on the machine frame at 24, and the other arm of which extends downwardly to a point adjacent to the base of the machine.

Pressure is applied to the lever 23 through a toggle 25 having one end pivoted at 26 to the lower end of the lever 23 and having its opposite end mounted on a stationary pivot 27. It will be evident from an inspection of Fig. 3 that when this toggle is broken in a downward direction it will swing the lower end of the lever 23 toward the right and thus act through the connections with the center mold to lower this mold. Conversely, when the toggle is straightened it will operate through the connections with the center mold to raise this mold and thus apply the counter molding pressure to the entire set of molds.

This toggle straightening mechanism comprises a pair of links 30 pivoted at their lower ends to the knuckle joint 31 of the toggle. These links consist of rods having their upper ends threaded and arranged to slide through holes formed in a yoke 32 which is mounted on the rods. Above the yoke these rods are encircled by springs 33 which abut against nuts 33' threaded on the rods to provide for the adjustment of the tension of the springs. Nuts 34 threaded on the rod below the yoke 32 provide for the adjustment of the yoke longitudinally of the links 30.

Figure 1:
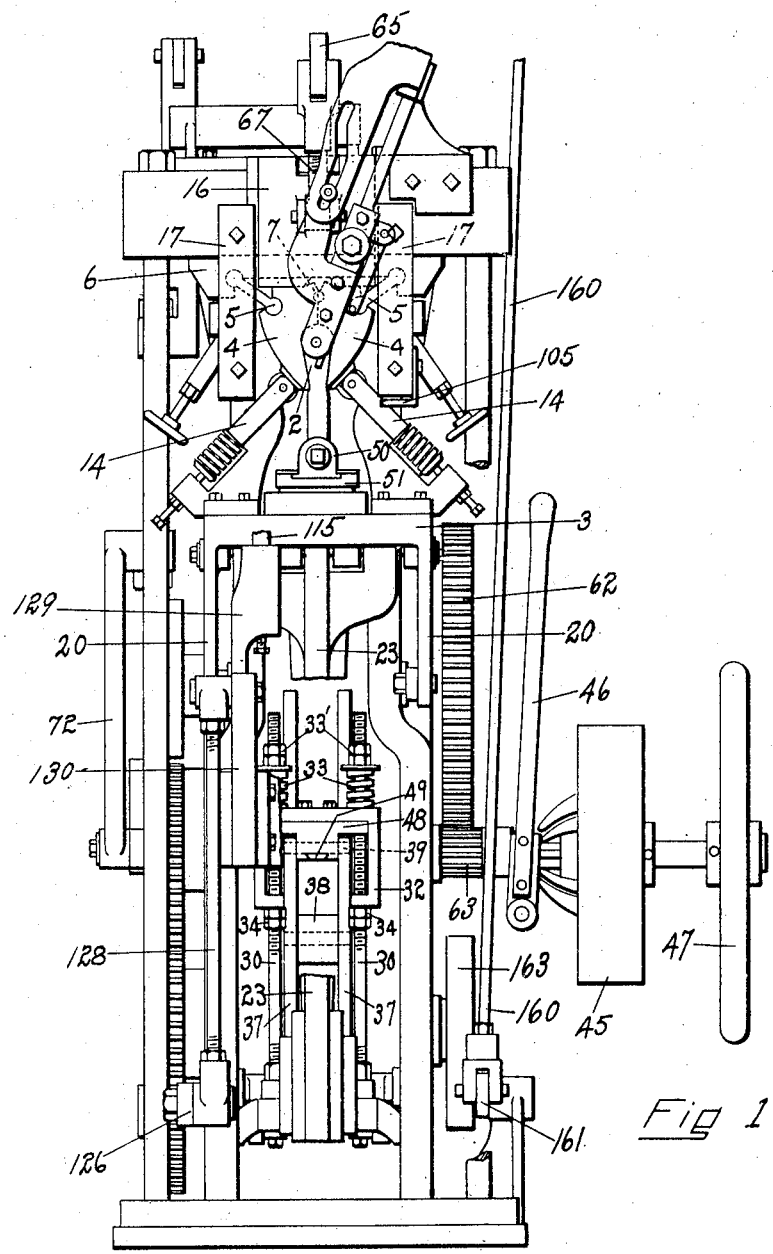
Figure 1 is a front elevation of a machine embodying this invention certain parts being removed for the sake of clearness.

Power is transmitted to the yoke and thence to the toggle by means of a cam 35 mounted fast on a shaft 36 and arranged to operate a cam follower 37 which carries a roll 38 running on the periphery of the cam 35. This cam follower is pivoted at 39 to the yoke 32 and it is guided in its movement produced by the cam 35 by blocks 40 and 41, the former being mounted on the shaft 36 and the latter on a stud fixed in the machine frame. The shaft 36 is driven by a gear 42 mounted fast on said shaft and meshing with a pinion 43 secured on a driving shaft 44 on which a loose pulley 45, Fig. 1, is mounted to rotate and is arranged to be connected to the shaft 44 through a suitable clutch controlled by a lever 46. A hand wheel 47 also is provided to turn the driving shaft 44. The pivotal connection between the cam follower and the yoke comprises a block 48 bearing against the lower face of the yoke and secured in position by the rods 30, Fig. 1, this yoke being provided with a bearing socket to receive the pivot pin 39. A keeper 49 mounted in a dovetail groove in the lower part of the block 48 bears against the lower face of the pivot pin 39 and retains the pin in its bearing socket. A screw or bolt secures this keeper to the block.

It will now be evident that when the cam follower 37 is raised by the cam 35 it will lift the yoke 32 and this motion will be transmitted through the springs 33 to the links 30 and by them to the knuckle joint 31 of the toggle, thus applying a powerful straightening movement to the toggle which will be multiplied through the lever 23 as it is transmitted to the center mold 2. The cam 35 preferably is designed with a relatively low part $a$ which brings the molds into counter gripping position and with a high portion $b$ which applies the counter molding pressure to the molds. It will be evident that this mechanism, while constructed to apply an exceedingly powerful pressure to the molds, provides for a very fine adjustment of this pressure through the relative adjustment of the yoke 32 and the links 30. At the same time, it avoids the use of the excessive friction which has been present in the operating mechanism of this type heretofore proposed. The shaft 36 runs practically free, so far as this mechanism is concerned, while the roll 38 is on the idle portion of the cam 35 and the waste of energy made necessary by the friction devices heretofore largely used in these mechanisms thus is avoided. A further advantage of this arrangement is that the cam 35 eases the parts down when the opening movement of the molds is effected and thus eliminates the noise and shock incident to the use of former mechanisms of this type. While the springs 33 yield only very slightly, if at all, in the normal operation of a machine, they protect the parts against breakage in the event that an unusually thick blank is encountered or in the event that a blank is accidentally fed into the molds on top of a molded counter.

It is obvious that when the cam 35 rotates far enough to cause the roll 38 to run off the high part $b$ of the cam, the weight of the parts will break the toggle in a downward direction and thus lower the center mold in readiness for the counter doffing operation.

The operating mechanism for the molds also includes means for moving the center mold back and forth bodily into and out of the vertical plane of the side molds for the purpose of facilitating the doffing operation. To this end the center mold 2 is mounted on a bracket 50 to which it is removably secured in order to facilitate the changing of the center mold for different styles of counters, and this bracket slides back and forth in a guideway formed in a plate 51 that is mounted on the upper end of one of the adjusting members 15. A rod 52 is pivoted to the bracket 50 and passes loosely through a block 53 that is held against adjusting screws 54 by means of a spiral spring 55 which encircles the rod and abuts against adjusting screws 56. A lever 57 fulcrumed on the machine frame at 58 is pivotally connected to the block 53 and carries a roll 59 which runs in a cam path formed in a cam 60 mounted fast on the shaft 61. This shaft is driven by a gear 62, Figs. 1 and 2, fast on the shaft 61 and meshing with a pinion 63 on the driving shaft 44. This mechanism operates to move the center mold bodily forward in front of the plane of the side molds after a counter has been molded and into the plane of the doffing mechanism which removes the counter from the center mold, and this mechanism then returns the center mold again to a position in the plane of the side molds in readiness to receive the next counter and mold it, the forward movement of the center mold being yieldingly effected in order to avoid breaking the parts in the event of any obstruction to this movement. This bodily movement of the center mold carries the counter thereon forward to a position clear of the side molds and permits the doffing mechanism to be located and operated in a fixed vertical plane substantially parallel to the plane of the side molds and well forward thereof.

While the molds compress the counter and shape it, the wiper 16 is moved downwardly to carry the wiper plate 18 over the faces of the molds and cause it to crimp the counter flange or lip that projects beyond the faces of the molds. In the present construction the operating mechanism for the wiper is arranged to give it a plurality of flange crimping movements in each cycle of operations of the machine. This mechanism is clearly shown in Figs. 2 and 3 and comprises a lever 65 fulcrumed on the head of the machine frame at 66 and connected at its forward end by a link 67 to the wiper 16. A weight 68 is mounted on the rearward end of the lever to maintain the wiper normally in its raised position. The upper limit of this position is determined by an adjustable stop 69 positioned to engage the rearward arm of the lever 65.

The operating mechanism for the wiper also comprises a driving mechanism normally having a lost motion connection with the wiper and another power driven mechanism that controls the operative relationship between the driving mechanism and the wiper. The driving mechanism above referred to is constantly operated and comprises a crank 70 fast on a shaft 71 which also carries a gear meshing with the pinion 43 on the main driving shaft. A pitman rod 72 is pivoted to the crank 70 and is slotted at its upper end, as indicated at 73, to receive a block 74 that rocks on a stud 75 projecting from one side of the lever 65. Normally as the pitman 72 reciprocates its upper end slides back and forth on the block 74, but at certain times these two parts are connected together for movement in unison, thus interrupting the lost motion relationship that ordinarily exists between these members. This function is performed by a latch 76 pivoted on the upper end of the pitman at 77 and arranged to be moved into and out of the path of relative movement of the block 74 in the slot 73 by a lever 78, the upper end of which has a sliding connection with the latch 76 and the lower end of which carries a roll running in the cam path formed in the face of a cam 80 secured fast on the shaft 61.

It will be clear from an inspection of Fig. 2 that so long as the parts are maintained in the relative positions in which they are shown in this figure, the wiper will remain in the position in which it is there shown. When, however, the cam 80 has rotated far enough to swing the lower end of the lever 78 outwardly away from the machine frame, the upper end of the lever will move the latch 76 inwardly causing the jaw or projection 81 with which this part is provided to slide under the block 74 and thus lock the block 74 in the upper end of the slot 73. This establishes a driving connection between the wiper and the pitman, and the cam 80 is designed to maintain this connection until the wiper has made two complete oscillations or reciprocations. It is obvious that this number could be varied if desired by changing the design of the cam 80. Since the cam 80 which operates the latch and the crank 70 which drives the pitman rod 72 to operate the wiper are positively geared to the operating mechanism for the molds, the parts are constantly maintained in a correctly timed relationship. The departure from the prior arrangement of giving the flange of the counter a single crimping operation not only produces very advantageous results, particularly in forming a counter that retains its shape better than counters manufactured according to the usual methods, but also in improving the consistency or physical characteristics of the material itself. This improved result appears to be due in part to the fact that the counter is kept under an exceedingly heavy molding pressure for a longer time than is usual in the prior machines, and it undoubtedly is due in a large measure to the fact that the act of subjecting each counter to a plurality of counter crimping operations sets the flange and adjacent parts of the counter to the configuration of the molds more firmly than would otherwise be possible. It has been demonstrated that this arrangement produces fully as satisfactory results without the heating of the molds as are produced when the molds are heated, and avoids the expense and apparatus required for the purpose of heating the molds.

The mechanism for feeding the counter blank to the molds comprises a counter holder, a carrier supporting the counter holder, and mechanism acting on the holder or the carrier to give the holder the movements necessary to cause it to deliver a counter blank to the molds and return again to its counter receiving position. The counter holder comprises a central counter engaging member 85, Figs. 8 to 11, two outer co-operating counter engaging members or abutments 86 and a plate 87 on which these parts are supported. The parts 86 are slotted to receive screws 88 on which these members may be adjusted toward and from the central counter holding member 85 and by means of which they may be secured in their adjusted positions. The member 85 has the general outline of a horseshoe and the parts 86 are designed to be so adjusted with reference to it that only very narrow spaces will be provided between the opposite sides of the part 85 and the adjacent faces of the parts 86 to receive the edge of a counter bent into a U-shape. If desired, leaf springs 89 may be secured to the inner edges of the member 86 to extend into the counter receiving spaces between the parts 85 and 86 to compensate for variations in thickness of the stock and provide a yielding grip for the edge of the counter. These springs, however, may or may not be used, as desired. The counter is indicated at C in Figs. 8, 9 and 11 in the position that it normally occupies in the holder. The forward ends of the counter abut against an upturned lip of a breast gage 90 which is slotted to receive screws 91 that permit its adjustment toward and from the other counter engaging members and which serve to secure it in its adjusted position.

As indicated in the drawings, the counter is held by the engagement of the counter holding devices with opposite faces of the sides of the blank near its edge. These parts retain the blank while it is being moved into the grip of the molds. As soon as the molds grasp the blank, even with the preliminary pressure produced by the cam roll 38 riding up on the surface $a$ of the cam 35, they make the counter conform to the shape of the molds and these molds usually are so designed that they tend to turn or roll the margin of the counter inwardly particularly at those portions of the counter near its forward ends. This will be evident from an inspection of Fig. 14 and an observation of the peculiar rounding shape of the counter near its forward ends.

In order to permit this preliminary shaping movement which takes place during the delivery of the counter to the molds by the holder, the holder is provided with means for moving the central counter engaging member 85 away from its counter holding position and into such a position that it will not interfere with the movement of the margin of the counter that is produced by the molds as just described. For this purpose the member 85 is mounted on the forward end of an arm 92 which is pivoted at 93 to the rearward end of the plate 87. Preferably the part 85 is removably secured to the arm 92 so that it can be replaced by a similar part of different size or design for feeding different sizes or styles of counters. Two bolts 94, secured at their upper ends in the arm 92 and projecting loosely through holes in the plate 87, are encircled below the plate by springs 95, each of which abuts at one end against the lower face of the plate and at its opposite end against a nut threaded on the bolt, so that these springs tend to move the arm 92 and the member 85 into a recess formed in the plate 87 below these parts and into such a position that at least the greater part of the member 85 will lie below the plane of the upper face of the plate 87. This part 85 thus is dropped below the plane of the lower edge of the counter blank when it is moved out of its counter holding position.

When the holder is in its counter receiving position the central counter holding member 85 is held in its counter holding position by the engagement of the arm 92 with the head of a bolt 97 that is secured in the carrier for the holder, and this part is retained in this position during the counter feeding movement by a latch 98, Fig. 11, pivoted on the plate 87 at 99, and arranged to swing from the position in which it is shown in Figs. 10 and 11, where it underlies the arm 92, into a notch 100 where it releases the part 85 and permits the springs 95 to depress this part. A rod 101 is pivoted to the latch 98 and is encircled by a spring 102, which bears against a bracket 103 through which the rod loosely extends and abuts against adjusting nuts 104 on said rod. These thus act to retain the latch in the position in which it appears in Fig. 11. The latch 98 retains the counter holding member 85 in its counter holding position until it is tripped by a stop 105, Fig. 1, during the act of delivering the counter to the molds.

The carrier for the counter holder comprises a plate 106, Fig. 8, pivoted at its forward end, as indicated at 107, to ears projecting from a plate 108, that is bolted rigidly to another plate 109. This plate is provided with a dove-tail base arranged to slide in a dove-tail groove formed in another plate 110, and the relative adjustment of these two plates is effected by the operation of a screw which is turned by the hand wheel 112. The plate 110 also is grooved in its lower face to slide transversely on a bracket plate 113 and a screw threaded adjustment controlled by the hand wheel 114, Fig. 9, is provided to move the plate 110 and the parts supported thereby relatively to the bracket 113.

The carrier is mounted to slide horizontally toward and from the front face of the molds, and for this purpose the bracket 113 is provided with a dove-tail that slides in a groove formed in an L shaped bracket 115, (see Figs. 10 and 11). A link 116 pivoted at one end to the bracket 113 is connected with a lever 117 in the same manner that the link 52 is connected with the lever 57, and the lever 117 carries a roll that runs in a cam path formed in the face of a cam 118 that rotates with the shaft 61. The cam 118 is designed to move the counter holder carrier back and forth on the L shaped bracket 115 in the proper time relationship to the movements of the molds. This mechanism, however, merely reciprocates the carrier in a horizontal plane; and in order to swing the counter holder from a horizontal position in which it receives the counter blank to a vertical position enabling it to deliver the blank to the molds, the carrier plate 106 has bolted to it a cam 120, Figs. 2 and 10. This cam has a peculiarly shaped cam slot 121 which receives a roll 122 that is mounted on a stud projecting from a bracket 123 which is secured to the upper edge of the L shaped bracket 115. The cam 120 turns on the pivot 107 and the motions imparted to the holder carrier through its connections with the cam 118 operate through the action of the cam 120 on the roll 122 to swing the holder from a horizontal into an upright position while the carrier is being moved forward and to return the holder again to its horizontal position while the carrier is being moved backward.

After the holder has been moved forward and swung up into its vertical position to place the counter blank between the molds, the holder and the carrier therefor are both raised in unison with the upward movement of the center mold so as to retain the counter blank in the proper position between the molds until it is firmly gripped by the molds. This operation is performed by a cam 125, Fig. 2, mounted fast on the shaft 36 and acting on a cam roll carried by the rear end of a lever 126 which is fulcrumed at 127 and has a link 128 pivoted to its forward end, the upper end of said link being pivoted to a slide 129 mounted in a vertical guideway formed in a bracket 130 which is secured to the machine frame. The shank of the L shaped bracket 115 sets in a slot formed in the upper end of the slide 129 and it is secured therein by a bolt and slot connection 131 which coöperates with a thrust bolt 132 to provide for the vertical adjustment of the bracket 115 and the parts carried thereby relatively to the molds.

In order to adjust the vertical angle at which the counter is delivered to the molds, the holder carrier plate 106 is secured to the cam 120 by a bolt 134, Fig. 2, which passes through a slot formed in the cam and permits the adjustment of the plate 106 and the counter holder about the pivot 107 as an axis.

For the purpose of providing for a lateral rocking adjustment of the counter holder, the holder plate 87 is provided with two depending lugs 135, Figs. 8 and 9, through which a rod 136 extends, as best shown in Figs. 8 and 9, and adjusting bolts 137 are threaded through the plate 106 at opposite sides of the rod 136 and bear against the bottom of the plate 87. It is obvious that by manipulating these bolts properly the holder may be tipped or rocked laterally to adjust the lateral angle at which the counter will be presented to the molds.

The counter holder may be adjusted vertically with reference to the center mold by means of a plate 138, Figs. 8 to 10, which straddles one of the lugs 135 and is secured to the back or lower face of the carrier plate 106 by means of two screws 139 that pass through slots formed in the plate 138 and thus permit the adjustment of this plate longitudinally of the holder carrier, the screws serving to clamp the plate and the member 87 in an adjusted position with reference to the carrier plate.

It will now be understood that normally the counter holder rests in its horizontal or counter receiving position in which it is shown in Figs. 8 and 9. The attendant takes a counter blank of the form shown in Fig. 13, bends it into a U shape, and forces it into the holder until its forward ends abut against the upturned lip of the breast gage 90. The counter at this time is in substantially the position in the holder in which it appears at C, in Figs. 8, 9 and 11. The center mold 2 at this time is in its forward position but it is immediately returned to a position in a plane of the side molds and the cam 118 then acts through its connections with the counter holder carrier to move the carrier forward, this operation serving also to swing the holder up into its vertical position. This movement of the carrier places the counter blank on the center mold while this mold is in its lowered position. It will be noted that the counter is held by the engagement of the counter holding devices with the edge of the counter so that the body of the blank projects beyond the counter holding devices, and the holder thus is enabled to retain its engagement with the blank after it has presented the blank to the center mold. As the center mold is raised by the toggle mechanism, above described, the counter holder also is raised through its connections with the cam 125 to move the counter holder up in unison with the center mold. As the mold nears the upper limit of its stroke the side molds are closed in upon it, thus gripping the counter blank and as they conform the blank to the mold the head of the bolt 140, Fig. 11, strikes a stop 105, Fig. 1, mounted on the machine frame and trips the latch 98 whereupon the springs 95 immediately move the center counter holding member 85 into its depressed position where it lies below the plane of the lower edge of the counter blank. The fact that the bolt 140 is adjustable in the latch 98 enables the operative to time this movement very accurately with reference to the movements of the molds. The counter holder is immediately moved back into its original position in readiness to receive another counter blank and, as it is swung into its horizontal position, the bottom of the arm 92 strikes the head of the bolt 97 and lifts the counter holding member 85 into its counter holding position. The latch 98 is immediately snapped into place by the spring 102 which retains this member in this position until the holder again delivers a counter to the molds. In the meantime the toggle mechanism has applied the counter molding pressure to the molds and the wiper 16 has been operated to turn over or crimp the projecting flange on the counter and iron this flange down, the wiper being given a plurality of flange crimping movements by the operating mechanism therefor above described.

When the counter molding operation has been completed as just described, the toggle mechanism is broken to lower the center mold and swing the side molds laterally away from the center mold and then the center mold is moved forward on the slide 51 by means of its connection with the cam 60. While the center mold is in this position the counter is removed from it or doffed.

The doffer normally is in its elevated position but as the center mold is moved forward with the molded counter on it the doffer is lowered, and the movements of the parts are so timed that the doffer finger 145 (see Figs. 4 and 5) just meets the front face of the mold and then begins to rise while the mold remains stationary. The finger thus slides under the flange $c'$ of the counter C. It is then moved to lift the counter lengthwise off the mold and carry it to one side of the mold.

For this purpose the finger 145 is mounted fast on a short shaft 146 to which a pinion 147 is fixed. The pinion is held against rotation during part of its doffing movement and is rotated during another part of said movement. Both the shaft and pinion are mounted in a carrier 148 which is pivoted at 149, Fig. 5ª, to a small bracket 164 secured to the lower end of a slide 150. This slide is reciprocated in ways formed in the bracket 151 secured to the machine frame, and during this reciprocating movement a cam roll 152 carried by an arm projecting from the carrier 148 and running in a cam slot 153 formed in the bracket 151 operates to swing the carrier about the pivot 149. It will be noted that the slide 150 is slightly inclined toward the right, Fig. 5, with reference to the median plane of the center mold but that this inclination is not sufficient to prevent the doffer from moving the counter in the general direction of the length of the mold. The cam path 153 is so designed that the doffer finger practically clears the counter from the center mold before it begins to swing toward the right and this swinging movement then operates to throw the counter laterally away from the center mold. The lateral movement of the doffer is stopped relatively suddenly so that the momentum of the counter carries it clear of the machine.

The turning movement of the finger 145 above referred to is provided for the purpose of facilitating the clearing of the counter from the doffer during this lateral movement. It will be seen from an inspection of Figs. 4 and 5ª that the rearward face of the finger 145 is beveled, and it is obvious that if this finger is turned in the direction in which the counter is being carried any possibility of the flange c′ of the counter catching on the finger 145 will be avoided, since this flange will then slide freely off the beveled face of the finger. For the purpose of producing this rotative movement a rack 154 is slidably mounted in the carrier 148 in position to mesh with the pinion 147 and a link 155 pivotally connects this rack with the lower end of the slide 150. Consequently as the carrier 148 is swung laterally in the manner above described the connection between the rack and the slide 150 will move the rack 154 downwardly, thus rotating the pinion and the finger 145 in a clockwise direction. The extreme right hand position of the doffer parts is indicated in dotted lines in Fig. 5.

The mechanism for reciprocating the slide 150 comprises a link 156 pivoted at one end to the slide and at its opposite end to a lever 157 fulcrumed on the machine frame at 158. This lever has a swivel connection at 159 with the upper end of a rod 160, the lower end of which is pivoted to a cam follower 161, Fig. 2, carrying a roll that runs in a cam path 162 of a cam 163 rotating with the shaft 36. This mechanism, by moving the counter off the center mold in a direction substantially lengthwise of the mold until the counter has practically cleared the mold, avoids any tendency to spread the upper edges of the counter. At the same time this mechanism works very smoothly and efficiently, is simple to manufacture, is not liable to get out of order, and will give a very long period of service without requiring repair or replacement of the parts.

As above stated, the center mold 2 is moved forward out of the plane of the side molds at substantially the same time that the doffer is moved downwardly to engage the counter on the center mold. A mechanism is provided to adjust the doffer in a direction parallel to the forward and backward movement of the center mold. This mechanism is best shown in Fig. 5ª and it comprises a spiral spring 165 encircling the pivot stud 149 and bearing at one end against the bracket 164 and at its opposite end against a washer 166 which is pinned to the outer end of the pivot 149. This pivot is fixed in one part of the carrier 148 and consequently the spring 165 tends to move the carrier and the doffer finger 145 toward the left, as the parts are shown in Fig. 4, in a direction away from the front face of the center mold 2. A cap 167 incloses the spring 165 and the washer 166 and is threaded on to a part of the bracket 164. An adjustable bolt 168 threaded through the end of the cap 167 bears against the end of the pivot stud 149 and constitutes a means for adjusting this pivot stud and the holder 148 in opposition to the spring 165. This mechanism affords a convenient means for adjusting very accurately the point at which the doffer finger 145 will meet the center mold 2 preparatory to performing its doffing function.

An alternative form of doffer is illustrated in Figs. 6 and 7 and 7ª. The construction shown in these figures includes many of the parts shown in Figs. 5 and 6 and these parts are designated by the same reference numerals used in the latter figures. The doffer finger 170 is secured fast to a dovetail plate 171 which is adjustably fastened by bolts 172 in a block 173 secured to a slide 175. This slide is mounted in ways formed in a frame 174 that is bolted to the lower end of the slide 150 which is reciprocated by connections including the rod 160 and a cam 163. The slide 175 is drilled to receive a compression spring 177 that abuts at one end against the bottom of the hole in this slide and its opposite end against a spacing block 176 at the lower end of the frame 174. The slide 175 normally is held in the position in which it is shown in Fig. 7 by a latch 178 pivoted on the frame 174 at 180. A spring 181 encircling a rod, as shown in Fig. 7, acts on the latch to hold it in this position. When the cam 163 acts through the connections with the slide 150 to raise the slide and thus pull the counter lengthwise off the center mold, the frame 174 and all the parts mounted thereon move bodily with the slide 150 until the upper beveled end of the latch 178 strikes the beveled end of a pivoted stop 182. The engagement of these two parts trips the latch 178, whereupon the spring 177 immediately expands and throws the slide 175 and the parts carried thereby, including the doffer finger 170, upwardly until the slide strikes the upper end of its guideway. The momentum thus imparted to the counter throws it clear of the doffer finger 170 and the counter then strikes a shield or guard 183 that is fastened to the side of the frame 174 and which deflects the counter laterally away from the molds. Since the counter has been carried forward by the center mold to a position clear of the side molds before the doffing operation is begun there is nothing to interfere with the doffing movement.

As the slide 150 continues to rise, carrying the frame 174 upwardly with it, it brings the slide 175 into contact with the lower end of a bar 184 which constitutes a stop. This stop, as clearly shown in Figs. 6 and 7, is adjustably secured to a part of the stationary bracket 187 which supports the doffer mechanism by bolts 185 which pass through slots formed in the bar and by a thrust bolt 186. The contact of the slide 175 with the stop 184 prevents any further upward movement of the slide and, as the part 150 continues to rise, the slide 175 is depressed against the tension of the spring 177 until the latch 178 is again seated on the upper end of the slide by means of the spring 181. When the doffer descends again to doff a counter, the latch 178 again comes in contact with the pivoted stop 182, but at this time it merely rotates this stop in a clockwise direction against the tension of a spring 190 so that the latch 178 is not tripped by its engagement with the pivoted stop during this stroke. The operation of the machine has already been so fully described in connection with the description of the various mechanisms that any further statement regarding the operation of the machine is believed to be unnecessary. While I have herein shown and described the best embodiment of the invention of which I am at present aware, it is obvious that this embodiment may be variously modified within the skill of the mechanic and the discretion of the designer without departing from the spirit or scope of this invention.

What is claimed as new, is:

1. A counter molding machine, having, in combination, coöperating counter shaping molds, operating mechanism for said molds, and feeder mechanism for presenting counter blanks to said molds, comprising counter holding devices arranged to engage both the inner and outer faces of each side of a counter blank bent into a U shape and means for moving the counter holding means that engages said inner faces away from its counter holding position during the delivery of the counter blank to said molds, and means for adjusting the timing of said movement of the latter counter holding means.

2. A counter molding machine, having, in combination coöperating counter shaping molds, operating mechanism for said molds, and feeder mechanism for presenting counter blanks to said molds, comprising counter holding devices arranged to engage both the inner and outer faces of each side of a counter blank bent into a U shape and means for moving the counter holding means that engages said inner faces into a position below the plane of the edge of said counter when the counter is gripped by said molds.

3. A counter molding machine, having, in combination, coöperating counter shaping molds, operating mechanism for said molds, and feeder mechanism for presenting counter blanks to said molds, comprising counter holding devices for engaging both the outer and inner faces of the opposite sides of a counter blank bent into a U shape, mechanism for moving said devices back and forth between counter receiving and counter delivering positions, means for moving the counter holding means that engages the inner faces of the sides of said blank away from its counter holding position during the delivery of the counter blank to said molds, and means for subsequently restoring the counter holding means so moved to its normal position again in readiness to receive another counter.

4. A counter molding machine having, in combination, coöperating counter shaping molds, operating mechanism for said molds, and feeder mechanism for presenting counter blanks to said molds comprising counter holding devices arranged to engage both the inner and outer faces of each side of a counter blank bent into a U shape and means for moving the counter holding means that engages said inner faces out of the path of movement of the sides of the counter blank before said sides of the blank are forced toward each other by the gripping action of the molds on the blank.

5. A counter molding machine, having, in combination, coöperating counter shaping molds, operating mechanism for said molds, and feeder mechanism for presenting counter blanks to said molds, comprising a counter holder mounted for swinging movement between a substantially horizontal counter receiving position and a counter delivering position in a different plane, means for giving said holder a bodily movement relatively to said molds, and mechanism for causing said bodily movement to produce said swinging movement.

6. A counter molding machine, having, in combination, coöperating counter shaping molds, operating mechanism for said molds, and feeder mechanism for presenting counter blanks to said molds, comprising a counter holder mounted for swinging movement between a substantially horizontal counter receiving position and a counter delivering position in a different plane, means for giving said holder a bodily movement relatively to said molds, a cam connected to said holder, and a roll coöperating with said cam to cause said bodily movement of the holder to produce said swinging movement.

7. A counter molding machine, having, in combination, coöperating counter shaping molds, operating mechanism for said molds, and feeder mechanism for presenting counter blanks to said molds, comprising a counter holder mounted for swinging movement between a counter receiving position and a counter delivering position, means for giving said holder a bodily movement relatively to said molds, a cam connected to said holder, and a roll coöperating with said cam to cause said bodily movement of the holder to produce said swinging movement, said cam and holder being relatively adjustable to vary the angle at which the holder will present the counter blank to said molds.

8. A counter molding machine, having, in combination, coöperating center and side molds, operating mechanism for said molds, and counter doffing means operative to move a counter substantially lengthwise of the center mold to clear it from the mold and then to throw said counter laterally away from the molds, both of said movements taking place in substantially the same plane.

9. A counter molding machine, having, in combination, coöperating center and side molds, operating mechanism for said molds, and counter doffing mechanism comprising a doffer finger arranged to engage the flange of a counter on the center mold, and operating mechanism for said finger constructed and arranged to give the finger a bodily movement substantially lengthwise of the center mold and then away from said molds in a different direction and operative to turn said finger in the direction of the latter movement.

10. A counter molding machine, having, in combination, coöperating center and side molds, operating mechanism for said molds, and counter doffing mechanism comprising a doffer finger for moving under the flange of a counter on the center mold, a carrier for said finger, means for giving said carrier a to and fro movement to doff the counter, and means for giving said finger a rotative movement during the to and fro movement of said carrier.

11. A counter molding machine, having, in combination, coöperating center and side molds, operating mechanism for said molds, and counter doffing mechanism comprising a doffer finger arranged to engage the flange of a counter on the center mold, a carrier supporting said finger for rotative movement, means for reciprocating said carrier, means for swinging said carrier, and mechanism operative during said swinging movement to rotate said finger in the direction of said swinging movement.

12. A counter molding machine, having, in combination, coöperating center and side molds, operating mechanism for said molds, and counter doffing mechanism comprising a doffer finger arranged to engage the flange of a counter on the center mold, a carrier supporting said finger for rotative movement, means for reciprocating said carrier, means for swinging said carrier, and mechanism for causing said swinging movement to rotate said finger in the direction of said swinging movement.

13. A counter molding machine, having, in combination, coöperating center and side molds, operating mechanism for said molds, and counter doffing mechanism comprising a doffer finger arranged to engage the flange of a counter on the center mold, a carrier supporting said finger for rotative movement, means for reciprocating said carrier, a cam acting on said carrier during said reciprocating movement to swing it, and a rack and pinion arranged to be operated by the swinging movement of said carrier to turn said finger on its axis in the direction of said swinging movement.

14. A counter molding machine, having, in combination, coöperating center and side molds, operating mechanism for said molds, and counter doffing means arranged to have a to and fro movement and operative to move a counter substantially lengthwise of the center mold to clear it from said mold and then to deflect said counter laterally away from the molds in a direction substantially in the plane of said to and fro movement.

15. A counter molding machine, having, in combination, coöperating center and side molds, operating mechanism for said molds, counter doffing mechanism comprising a doffer finger arranged to engage the flange of a counter on the center mold, and operating mechanism for said finger constructed and arranged to give the finger a to and fro movement and to stop the doffing movement of the finger suddenly, whereby the counter will be thrown off the finger by its momentum, said doffing mechanism being constructed and arranged to throw the counter away from the molds in a direction different but substantially in the plane of the to and fro movement of said doffer finger.

16. A counter molding machine, having, in combination, coöperating counter shaping molds, mechanism for operating said molds, and a wiper mounted to reciprocate over the faces of the molds to form a flange on a counter held in the grip of the molds, and operating mechanism for said wiper comprising constantly operated power driven means normally disconnected from said wiper, a latch for connecting said means with said wiper, and power driven means for operating said latch.

17. A counter molding machine, having, in combination, coöperating counter shaping molds relatively movable to grip or release a counter blank, and operating mechanism for said molds comprising a toggle for relatively moving the molds, power driven mechanism connected with the knuckle joint of said toggle and arranged to straighten the toggle to give the molds their counter molding movement, and yielding means between said knuckle joint and said power driven mechanism through which the motion of said power driven mechanism is transmitted to said toggle.

18. A counter molding machine, having, in combination, coöperating counter shaping molds relatively movable to grip or release a counter blank, and operating mechanism for said molds comprising a toggle for relatively moving the molds, a power driven cam, a cam follower operated by said cam, and connections between said follower and the knuckle joint of said toggle arranged to have a limited yielding movement and operative to transmit the motion of said follower to said knuckle joint to straighten the toggle and thereby give the molds their counter molding movement.

19. A counter molding machine, having, in combination, coöperating counter shaping molds relatively movable to grip or release a counter blank, and operating mechanism for said molds comprising a toggle for relatively moving the molds, a power driven cam, a cam follower arranged to be operated by said cam, a yoke connected with said follower to be moved thereby, a link connecting said yoke with the knuckle joint of said toggle, and yielding means interposed between the said yoke and said link through which the motion of the yoke is transmitted to the link to straighten the toggle and thereby give the molds their counter molding movement.

20. A counter molding machine, having, in combination, relatively movable side molds, a center mold movable toward and from the side molds, and mechanism for moving said center mold comprising a lever, a toggle connected at one end to said lever and having its opposite end mounted on a fixed pivot, a power operated cam, a cam follower operated by said cam, a yoke connected with said follower to be moved thereby, a link connecting said yoke with the knuckle joint of said toggle, and springs interposed between said link and said yoke.

21. A counter molding machine having, in combination, coöperating center and side molds, operating mechanism for said molds, and counter doffing mechanism comprising a doffer finger arranged to engage the flange of a counter on the center mold, a pinion on which said finger is mounted, a rack engaging said pinion, a carrier supporting said pinion, means for reciprocating said carrier, means for causing said reciprocating movement to swing said carrier and means for causing said swinging movement to operate through said rack and pinion to turn said pinion about its axis and thereby to turn said finger.

22. A counter molding machine having, in combination, coöperating counter shaping molds, mechanism for operating said molds, a wiper coöperating with said molds to form a flange on the counter while it is held in the grip of said molds, and operating mechanism having a fixed time relationship to the operation of said mold operating mechanism for giving the wiper a plurality of flange crimping movements in each cycle of operations of the machine.

23. A counter molding machine having, in combination, coöperating counter shaping molds, mechanism for operating said molds, a wiper mounted to reciprocate over the faces of said molds to form a flange on a counter held in the grip of said molds, and operating mechanism for said wiper constructed to maintain a fixed time relationship between the movements of said wiper and the operative movements of said molds, said mechanism including a cam controlling the number of times that the wiper operates on each counter.

24. A counter molding machine having, in combination, coöperating counter shaping molds, mechanism for operating said molds, a wiper mounted to reciprocate over the faces of the molds to form a flange on a counter held in the grip of the molds, and operating mechanism for said wiper comprising power operated driving mechanism for the wiper and additional power operated mechanism for controlling the operative connection between said driving mechanism and said wiper, said power operated mechanisms being positively connected with the operating mechanism for said molds.

25. A counter molding machine having, in combination, coöperating counter shaping molds, mechanism for operating said molds, a wiper mounted to reciprocate over the faces of the molds to form a flange on a counter held in the grip of the molds, and operating mechanism for said wiper comprising a constantly operated power driven member, relatively reciprocating parts for transmitting the motion of said member to said wiper arranged to have either a lost motion relationship or a positive driving relationship to each other, and power operated means for controlling said relationship between said parts.

26. A counter molding machine having, in combination, coöperating counter shaping molds, operating mechanism for said molds, and feeder mechanism for presenting counter blanks to said molds comprising a counter holder mounted for swinging movement from a substantially horizontal counter receiving position to a substantially vertical counter delivering position and for bodily movements toward and from the molds and also parallel to said molds, and mechanism for moving said holder in said directions.

27. A counter molding machine having, in combination, a center mold, coöperating side molds, mechanism for relatively moving said molds to mold a counter blank, additional mechanism for moving said center mold bodily from the plane of the side molds forwardly to carry the counter on the center mold substantially clear of the side molds and for returning said center mold again, and a counter doffing mechanism operating in a fixed vertical plane substantially parallel to the plane of the side molds and operative to remove said counter from the center mold while the center mold is in its forward position.

28. A counter molding machine having, in combination, a center mold, coöperating side molds, mechanism for relatively moving said molds to mold a counter blank, additional mechanism for sliding said center mold bodily forward out of the plane of the side molds to carry the counter on the center mold substantially clear of the side molds and for returning said center mold again, and a counter doffing mechanism operating in a fixed vertical plane substantially parallel to the plane of the side molds, and operative to lift said counter off the center mold longitudinally of the center mold while said center mold is in its forward position.

In testimony whereof I have signed my name to this specification.

AUGUSTE F. JACQUEMIN.